US009699719B2

(12) United States Patent
Ni et al.

(10) Patent No.: US 9,699,719 B2
(45) Date of Patent: Jul. 4, 2017

(54) SELF-ADAPTIVE COMMUNICATIONS NETWORK SELECTION

(71) Applicant: Spreadtrum Communications (Shanghai) Co., Ltd., Shanghai (CN)

(72) Inventors: Jinjin Ni, Shanghai (CN); Yi Jin, Shanghai (CN); Xianliang Chen, Shanghai (CN); Xiang Sun, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 29 days.

(21) Appl. No.: 14/072,791

(22) Filed: Nov. 6, 2013

(65) Prior Publication Data

US 2014/0128070 A1  May 8, 2014

(30) Foreign Application Priority Data

Nov. 6, 2012 (WO) ................ PCT/CN2012/084114

(51) Int. Cl.
*H04W 48/16* (2009.01)
*H04W 48/18* (2009.01)
*H04W 76/02* (2009.01)
*H04W 84/04* (2009.01)

(52) U.S. Cl.
CPC .......... *H04W 48/18* (2013.01); *H04W 48/16* (2013.01); *H04W 76/02* (2013.01); *H04W 84/042* (2013.01)

(58) Field of Classification Search
None
See application file for complete search history.

(56) References Cited

U.S. PATENT DOCUMENTS

| 2007/0171881 | A1* | 7/2007 | Zhang et al. ................. 370/338 |
| 2009/0124224 | A1* | 5/2009 | Hildebrand .......... H04J 11/0069 455/150.1 |
| 2009/0181651 | A1* | 7/2009 | Klassen ............ H04M 1/72547 455/414.1 |
| 2009/0325566 | A1* | 12/2009 | Bell ...................... H04W 48/04 455/419 |
| 2010/0015973 | A1* | 1/2010 | Islam .................... H04W 48/16 455/434 |
| 2010/0197301 | A1* | 8/2010 | Islam .................... H04W 24/00 455/434 |

(Continued)

FOREIGN PATENT DOCUMENTS

| CN | 102007799 A | 4/2011 |
| CN | 102197684 A | 9/2011 |

(Continued)

OTHER PUBLICATIONS

European Search Report regarding a European counterpart application 13185593.4.

*Primary Examiner* — Moustapha Diaby
(74) *Attorney, Agent, or Firm* — Kilpatrick Townsend & Stockton LLP

(57) ABSTRACT

A public land mobile network (PLMN) selection procedure may be generated that, when implemented, disables at least one resource of a particular mobile device to prevent a scan of particular ones of PLMNS that exhibit supported access technologies, and/or supported frequency bands of supported access technologies, incompatible with a preferred operation of the particular mobile terminal.

11 Claims, 8 Drawing Sheets

(56) References Cited

U.S. PATENT DOCUMENTS

2012/0071163 A1*  3/2012  Klingenbrunn ....... H04W 48/18
                                                              455/435.2
2012/0190361 A1*  7/2012  Shaikh ................ H04W 48/18
                                                              455/434

FOREIGN PATENT DOCUMENTS

| CN | 102238699 A | 11/2011 |
| GB | 2475094 A | 11/2011 |
| WO | 2011068557 A1 | 6/2011 |
| WO | 2011119862 A1 | 9/2011 |

* cited by examiner

| List Entry 306 | PLMN ID 308 | Supported RAT 310 | Supported Frequency Bands 312 | Other Feature(s) 314 |
|---|---|---|---|---|
| A | MCC \| MNC<br>PLMN 204a ID | GSM | 900/1800 | SMS-CB Supported |
| B | MCC \| MNC | WCDMA | 850 | ... |
| ... | | | | |
| UE Access Technology Configuration And Preferred Network Access | | | Rank 1: LTE (C. Int. A)<br>Rank 2: WCDMA (C. Int. B)<br>Rank 3: GSM (C. Int. C)<br>320 | 800 (LTE)<br>850 (WCDMA)<br>850/1900 (GSM)<br>900/1800 (GSM)<br>322 |
| UE Exception List | | | If no designated PLMN-specific band allocation scheme, then set exception flag to scan all UE supported RATs, and all supported frequency bands<br>324 | Scan Flag (Y/N)<br>326 |
| | | | Chipset Designator (Multi-chip/Single-Chip)<br>328 | Resource Disable (HW/SW/All)<br>330 |

PLMN-specific Data 302

UE-specific Data 304

UE Configuration and Priority Data 316

UE Exception Data 318

SELF-ADAPTIVE COMMUNICATIONS NETWORK SELECTION

CROSS REFERENCE TO RELATED APPLICATIONS

The present application claims priority to PCT application No. PCT/CN2012/084114, filed on Nov. 6, 2012, and entitled "self-adaptive communications network selection", the entire disclosure of which is incorporated herein by reference.

BACKGROUND

Modern multimode mobile devices allow an end-user the flexibility to connect with multiple, differently configured networks using a single device. In such devices, however, a trade-off may exist between device complexity and performance. It may therefore be advantageous to optimize the allocation of device resources in scenarios where a degradation in performance may be perceived by an end-user.

SUMMARY

In one aspect, a method for generating a public land mobile network (PLMN) selection procedure is disclosed. The method may include, for example, identifying one or more PLMNs each operably configured to provide coverage within at least a portion of a particular geography. The method may further include determining a supported access technology, and supported frequency bands of the supported access technology, of each of the PLMNs. The method may still further include generating the PLMN selection procedure that, when instantiated, disables at least one of a software resource and a hardware resource of a particular mobile terminal to prevent a scan of particular ones of the plurality of PLMNS that exhibit supported access technologies, and supported frequency bands of supported access technologies, incompatible with a preferred operation of the mobile terminal.

In another aspect, a computer-implemented method is disclosed that may include, for example, searching a resource list that identifies one or more public land mobile networks (PLMNs) and that specifies an access technology configuration of each one of the one or more PLMNs. The method may further include comparing an access technology configuration of a particular mobile device against the access technology configuration of each one of the PLMNs to identify ones of the PLMNs that exhibit at least one supported access technology in common with the device. The method may still further include selecting at least one PLMN as a candidate network to serve the device within a particular geographic region. The method may still further include implementing a PLMN selection procedure that scans supported access technologies, and supported frequency bands of supported access technologies, of the at least one PLMN, that are compatible with the device, and that disables a resource of the device operably configured to scan supported access technologies, and supported frequency bands of supported access technologies, of the at least one PLMN that are incompatible with a preferred operation of the device.

In another aspect, a multimode mobile device is disclosed. The device may include, for example, one or more communication interfaces each operably configured to communicate with at least one public land mobile network (PLMN) according to a particular access technology. The device may further include at least one memory cache configured to store a data list that specifies an access technology configuration of the device, and an access technology configuration of each of one or more PLMNs, the PLMNs each operably configured to provide network coverage within at least a portion of a particular geographic region. The device may still further include a controller coupled to each one of the one or more communication interfaces and the at least one memory cache. The controller may be operably configured to implement a PLMN selection process that disables at least one of a software resource and a hardware resource of the device to prevent a scan of particular ones of the PLMNS that exhibit supported access technologies, and supported frequency bands of supported access technologies, incompatible with a preferred operation of the device.

This Summary does not in any way limit the scope of the claimed subject matter.

BRIEF DESCRIPTION OF THE DRAWINGS

FIG. 3 shows an example embodiment of a local resource list.

DETAILED DESCRIPTION

Figure 1:
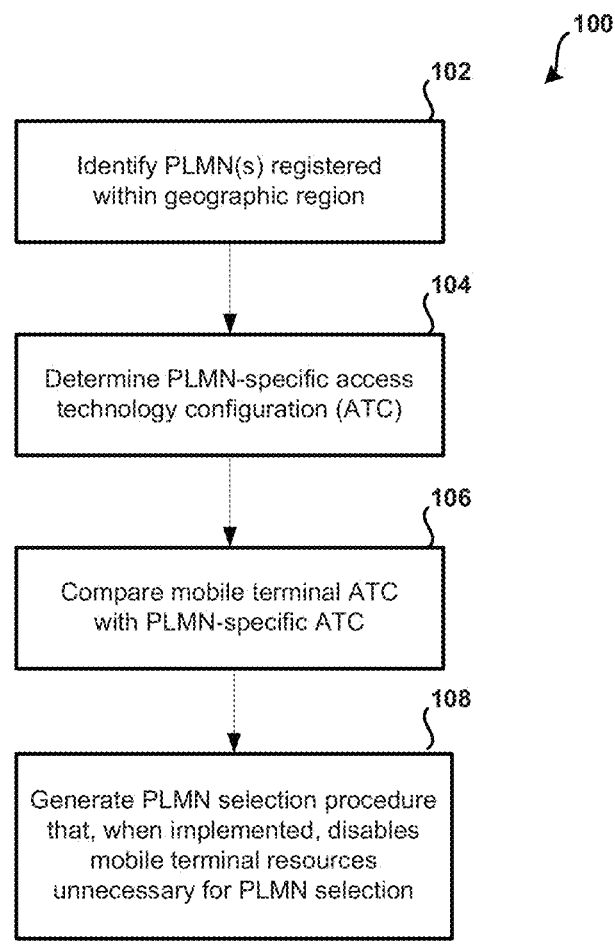
FIG. 1 shows a flowchart of an example method for generating a public land mobile network selection procedure.

The present disclosure is directed to systems and methods for optimizing an algorithm used by a mobile terminal to implement a PLMN (Public Land Mobile Network) selection scan. Although described in the context of a mobile communications environment, the various aspects of the present disclosure are generally applicable to any scenario in which it may be desirable to increase mobile device battery efficiency and improve end-user quality of experience or service. For example, and referring now to FIG. 1, a method 100 for generating a PLMN selection procedure is shown in accordance with the principles of the present disclosure. In general, the PLMN selection procedure may be used by a mobile terminal to implement a PLMN selection scan.

The example method 100 may include identifying (module 102), by a mobile terminal, one or more PLMNs that are each respectively configured to provide network services or coverage, to compatibly configured computing devices, within a particular geographic region. In this manner, the mobile terminal is configured to resolve each ROA (Recognized Operating Agency) that provides land mobile telecommunications services within a certain area, district, or territory. For example, the mobile terminal may query, as part of a discovery process, a local resource list to determine that a particular PLMN A and a particular PLMN B are registered within a specific country C. In general, a particular MCC/MNC tuple is a PLMN-specific identifier. In this example, the mobile terminal may use a particular MCC (Mobile Country Code), which uniquely identifies the country C, as a query parameter to identify all PLMNs stored within the resource list that exhibit or contain the particular MCC. Thus, in the present example, the mobile terminal may uniquely identify PLMN A and PLMN B as ROAs that operate within the country C. Other embodiments are possible.

The example method 100 may also include determining (module 104), by the mobile terminal, a supported RAT (Radio Access Technology), and all supported frequency bands of a corresponding supported RAT, of each PLMN identified as configured to provide coverage within the particular geographic region (see module 102). The mobile terminal is thus configured to precisely identify a supported RAT, along with a corresponding supported band allocation scheme, as implemented by each respective PLMN. For example, the mobile terminal may query the local resource list (e.g., using a corresponding MCC/MNC tuple as a query parameter) and determine that PLMN A supports a GSM (Global System for Mobile Communications) access technology, and also determine that PLMN B supports a WCDMA (Wideband Code Division Multiple Access) access technology. In particular, the mobile terminal may, for example, determine that PLMN A supports GSM in bands 900 and 1800, and that PLMN B supports WCDMA in band 850. In this example, an ATC (Access Technology Configuration) of PLMN A may be represented by an identifier GSM-900/GSM-1800, and an ATC of PLMN B may be represented by an identifier WCDMA-850. Other embodiments are possible.

For example, and as described in further detail below, the mobile terminal may be configured to determine or identify missing or incomplete configuration details of a particular supported RAT. For example, in instances where there is some, but incomplete, supported RAT information within a local SIM/USIM (Subscriber Identity Module/Universal Subscriber Identity Module), the mobile terminal may access a particular resource list to identify missing or incomplete configuration details. For example, certain configuration details within the SIM/USIM may specify that a particular PLMN supports 3G communications, without designating type of supported access technology (e.g., WCDMA or TD-SCDMA). In this example, the mobile terminal may query or access the particular resource list and determine that the particular PLMN supports, for example, WCDMA. Accordingly, the mobile terminal may resolve missing or incomplete configuration details and use correct RAT configuration information in a subsequent PLMN selection process. Still other embodiments are possible.

The example method 100 may further include comparing (module 106), by the mobile terminal, an ATC of each identified PLMN (see module 104) against an ATC of the mobile terminal to identify each PLMN that is at least partially compatible with the mobile terminal. Accordingly, the mobile terminal is configured to identify each PLMN that is at least potentially capable of establishing a communications connection with the mobile terminal within the particular geographic region. For example, and assuming for the sake of discussion that an ATC of the mobile terminal may be represented by identifiers GSM-850/GSM-1900. GSM-900/GSM-1800, WCDMA-850, and LTE-800 (indicating that the mobile terminal supports a Long Term Evolution RAT in band 800), the mobile terminal may determine that the ATC of the mobile terminal is compatible, at least in part, with the ATC of PLMN A. This is because, in the present example, both the mobile terminal and PLMN A support GSM-900/GSM-1800. Additionally, the mobile terminal may determine that the ATC of the mobile terminal is at least partially compatible with the ATC of PLMN B. This is because, in the present example, both the mobile terminal and PLMN B support WCDMA-850. In another example, and assuming for discussion that the mobile terminal is not configured to support WCDMA-850, the mobile terminal may determine that the ATC of the mobile terminal is wholly incompatible with the ATC of PLMN B. This is because, in this alternate example, the two particular RATs supported by the mobile terminal (GSM and LTE) would be incompatible with the particular RAT supported by PLMN B (WCDMA). In this manner, the mobile terminal may identify or determine which ones of the PLMNs that provide coverage within the particular geographic region are incompatible, or at least partly compatible, with the mobile terminal. Other embodiments are possible.

The method 100 may still further include generating (module 108), by the mobile terminal, a PLMN selection procedure that, when implemented or otherwise instantiated by the mobile terminal, disables at least one resource of the mobile terminal that is configured to enable a scan of PLMN-specific supported access technologies, and supported frequency bands of PLMN-specific supported access technologies, that are evaluated as incompatible with a "preferred" operation of mobile terminal, described in further detail below. The mobile terminal is thus configured to intelligently manage local resources. For example, the mobile terminal may disable and/or power-down one or more resources of the mobile terminal that may be unnecessary for PLMN selection within the particular geographic region, and enable or power-on one or more resources that may be required for PLMN selection within the particular geographic region. In general, there are many different methods by which to enable/power-on and/or disable/power-down mobile terminal resources. For example, when particular resources are in a single protocol stack, a particular access technology may be disabled by setting one or more flags to avoid or otherwise prevent PLMN selection in the particular access technology, or setting one or more registers to disable a particular hardware device of the particular access technology. When resources are in a different protocol stack, the particular access technology may be disabled by setting that protocol stack to a "disabled" state, or an "off" state. Still other embodiments are possible.

For example, and continuing with the above discussion, the mobile terminal may disable or power-down any local software resource or hardware resource that would otherwise be allocated to implement a PLMN selection scan within GSM-850/GSM-1900 and LTE-800. This is beneficial because, in the present example, neither PLMN A nor PLMN B support the LTE access technology (which is supported by the mobile terminal), or GSM communication within bands 850 and 1900 (also supported by the mobile terminal). Similarly, the mobile terminal may enable or power-on any local software resource or hardware resource that would be required to implement a PLMN selection scan within GSM-900/GSM-1800 and WCDMA-850. This is beneficial because, in the present example, PLMN A supports GSM communication within bands 900 and 1800 (which is supported by the mobile terminal), and PLMN B supports WCDMA communication within band 850 (also supported by the mobile terminal). In this manner, the mobile terminal may prevent a scan of particular PLMNs within the particular geographic region that exhibit supported access technologies, and supported frequency bands of supported access technologies, that are evaluated as incompatible with a "preferred" operation of the mobile terminal.

An operation of the mobile terminal may be "preferred" when compatibility is uniquely identified (e.g., GSM-900/GSM-1800 is supported by both the mobile terminal and PLMN A). An operation of the mobile terminal may also be "preferred" when a particular communication interface of the mobile device is disabled to prevent potential interference with another particular frequency band of particular communication interface of the mobile device. For example, the mobile terminal may disable a GSM-850 interface when a WCDMA-850 connection is available and preferred, despite availability of a GSM-850 connection. Disabling a particular communication interface of the mobile device in such a manner is described in further detail below in connection with at least FIG. 2.

Such an implementation as discussed in reference to FIG. 1 may be beneficial in many respects, including at least maximizing mobile terminal battery lifetime and efficiency, as well as improving end-user quality of experience or service. In particular, implementing a PLMN selection scan based upon a PLMN selection procedure as described in example embodiments of the present disclosure may at least increase or otherwise enhance: 1) mobile terminal battery efficiency: 2) PLMN selection efficiency; and 3) perceived quality and success rate of both a mobile terminal (Mobile Terminating) call and a MO (Mobile Originating) call. In each case, this is because PLMN selection within non-existent access technologies, along with unsupported or potentially non-ideal frequency bands, may be completely avoided. More specifically, and as described in further detail throughout, permitting a PLMN selection scan of only co-supported RATs, and co-supported frequency bands, enables the mobile terminal to: 1) prevent wasteful power consumption; 2) more quickly select a PLMN within a particular geographic region; and 3) prevent or otherwise mitigate potential call interference. Other benefits are possible as well.

Further scenarios and beneficial aspects associated with optimizing an algorithm used by a mobile terminal to implement a PLMN selection scan are described below in connection with FIGS. 2-8.

Figure 2:
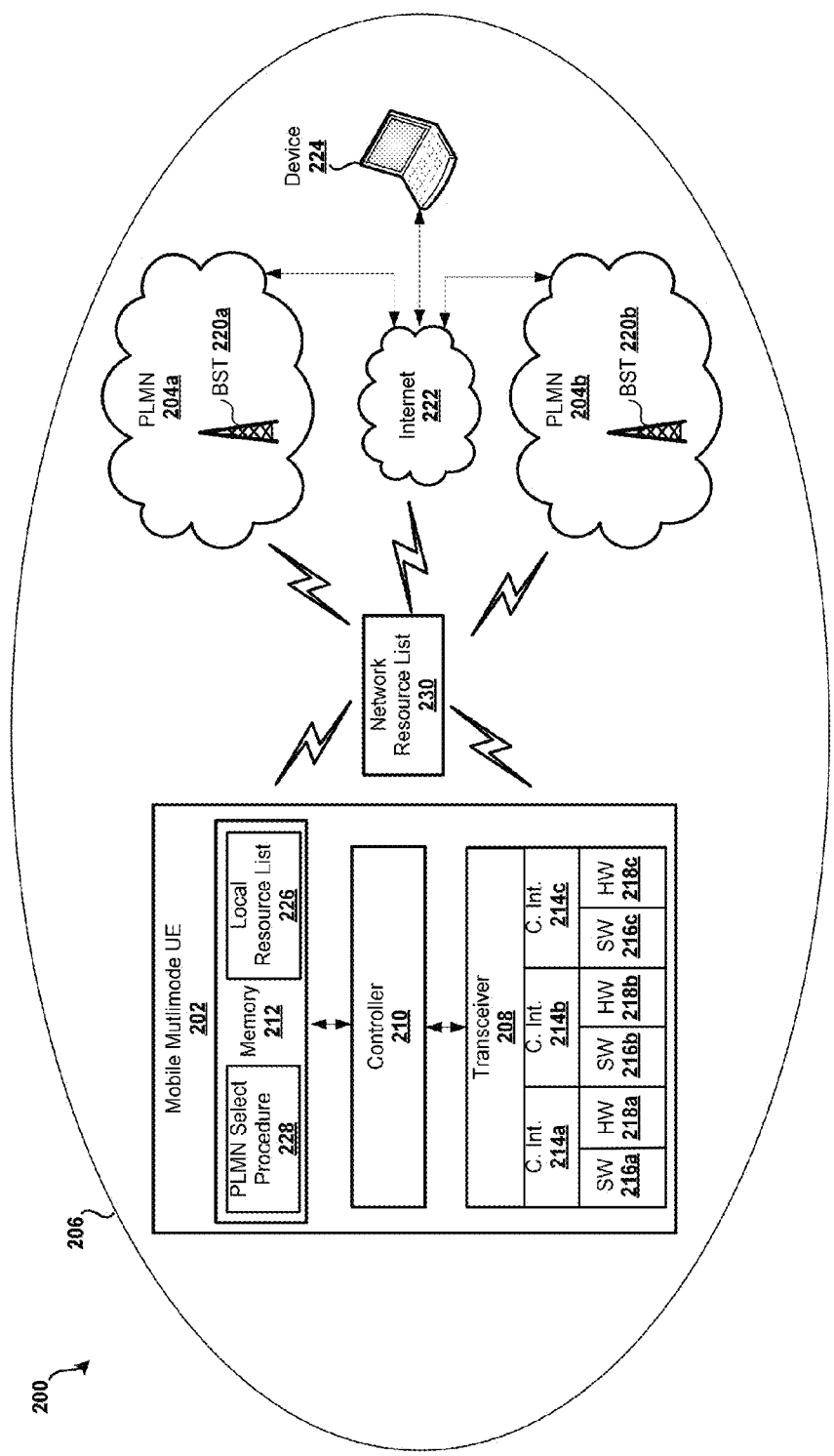
FIG. 2 shows a block diagram of an example simplified mobile communications environment.

Referring now to FIG. 2, a block diagram of an example simplified mobile communications environment 200 is shown. In general, the example environment 200 includes a mobile multimode UE (User Equipment) 202, and a plurality of PLMNs 204a-b. The PLMNs 204a-b are at least configured to wirelessly communicate with compatibly configured devices in accordance with a particular access technology. An example of a particular access technology includes, but is not limited to, the GSM (Global System for Mobile Communications) access technology, the CDMA (Code Division Multiple Access) access technology, the WCDMA (Wideband Code Division Multiple Access) access technology, the CDMA2000 (Code Division Multiple Access 2000) access technology, the TD-SCDMA (Time Division-Synchronous Code Division Multiple Access) access technology, the LTE (Long Term Evolution), and many others. Other embodiments of the mobile communications environment 200 are possible. For example, the environment 200 may include more or fewer PLMNs.

Each of the PLMNs 204a-b, along with the UE202, are spatially positioned within a particular geographic region 206 of arbitrary shape and size. In general, shape and size of the particular geographic region 206 may be determined by one or more of a tangible boundary (e.g., mountain range) and an intangible boundary (e.g., political boundary). The PLMNs 204 are each respectively configured to provide network services or coverage within at least a portion of the particular geographic region 206. Although not shown in FIG. 2, a coverage area of a particular one of the PLMNs 204a-b may or may not overlap with another one of the PLMNs 204a-b, and may or may not at least partially exceed a boundary of the particular geographic region 206.

The UE202 is shown to include a transceiver module 208, a controller module 210, and a memory module 212. In this example, the transceiver module 208 is shown to include a plurality of communication interfaces 214a-c, each respectively comprised of at least one corresponding software module 216a-c, and at least one corresponding hardware module 218a-c. For the sake of brevity, the PLMNs 204a-b are each shown to only include at least one corresponding BST (Base Station Transceiver) 220a-b. In general, the BSTs 220a-b each include one or more transceivers that provide a radio communications link(s) between the respective PLMNs 204a-b and the transceiver module 208 of the UE202. In an actual implementation, however, each of the respective PLMNs 204a-b may be composed of a plurality of interconnected components and interfaces, each respectively configured to facilitate the sending and receiving of information and messages to and from the UE202, the particulars only being determined by PLMN type and configuration.

For example, assuming that PLMN 204a is configured to implement or otherwise support a particular GSM access technology (e.g., GSM-900/GSM-1800). In this example, PLMN 204a may include various elements in addition to BST220a such as one or more BSCs (Base Station Controllers). MSCs (Mobile Switching Centers), GMSCs (Gateway Mobile Switching Centers), HLRs (Home Location Registers). VLRs (Visitor Location Registers), EIRs (Equipment Identity Registers), and AUCs (Authentication Centers). Additionally, each of the PLMNs 204a-b may be coupled to one or more other networks. For example, FIG. 2 shows each of the PLMNs 204a-b coupled to an Internet computer network 222, in turn, a computing device 224 is coupled to the network 222. In general, such connections may be any combination of wireless and hard-wired connections.

In practice, the UE202 is configured to perform or instantiate a PLMN selection scan within the particular geographic region 206 following a device reset event, such as device power-on or loss-of-coverage. Selection of a particular network (e.g., PLMN 204a) however may be perceivably slow, wasteful in terms of unnecessary power consumption, and susceptible to interference from band overlap between different RAT implementations. In one aspect, the UE202 may be configured to generate an optimized algorithm that addresses these and other issues.

For example, in operation, the transceiver module 208 may initially receive a broadcast from one or both of the PLMNs 204a-b following a particular device reset event. The broadcast may include various information such as, for example, a particular MCC code that uniquely identifies the particular geographic region 206. On receipt of the broadcast, the controller module 210 may query a local resource list 226 (e.g., using the particular MCC code as a query parameter), which is stored within the memory module 212, to identify the PLMNs 204a-b as networks that are registered to provide land mobile telecommunications services within the particular geographic region 206. For example, the controller module 210 may identify all PLMNs stored within the local resource list 226 that exhibit the particular MCC. In this manner, the UE202 may uniquely identify PLMN 204a and PLMN 204b as valid networks that operate within the particular geographic region 206. Other embodiments are possible.

Following unique identification of the PLMNs 204a-b, the controller module 210 may query the local resource list 226 (e.g., using a respective MCC/MNC tuple as a query parameter) to identify a supported RAT, and all supported frequency bands of a corresponding supported RAT, for each one of the PLMNs 204a-b. For example, the controller module 210 may determine that PLMN A supports the GSM access technology, in particular, GSM-900/GSM-1800. The controller module 210 may further determine that PLMN B supports the WCDMA access technology, in particular, WCDMA-850. Still further, the controller module 210 may query the local resource list 226 to identify all supported RATs, and all supported frequency bands of a corresponding supported RAT, for the UE 202. For example, the controller module 210 may determine that the communication interface 214a of the UE 202 is configured to support LTE-800, the communication interface 214b is configured to support WCDMA-850, and the communication interface 214c is configured to support GSM-850/GSM-1900 and GSM-900/GSM-1800. Other embodiments are possible.

The controller module 210 may further compare an ATC (Access Technology Configuration) of each of the PLMNs 204a-b against an ATC of the UE 202 to identify ones PLMNs 204a-b that are at least partially compatible with the UE 202. For example, the controller module 210 may determine that the communication interface 214a of the UE 202 is compatible with neither PLMN 204a nor PLMN 204b. This is because, in the present example, both PLMN 204a and PLMN 204b do not support the LTE access technology. The controller module 210 may further determine that the communication interface 214b is incompatible with PLMN 204a, but compatible with PLMN 204b. This is because, in the present example PLMN 204a does not support WCDMA-850, whereas PLMN 204b does support WCDMA-850. The controller module 210 may still further determine that the communication interface 214c is compatible with PLMN 204a, but incompatible with PLMN 204b. This is because, in the present example, PLMN 204a supports GSM-900/GSM-1800, whereas PLMN 204b supports neither. In this manner, the UE 202 may identify or determine which ones of the PLMNs 204a-b that provide coverage within the particular geographic region 206 are incompatible, or at least partly compatible, with the UE 202. Other embodiments are possible.

Following the identification of ones of the PLMNs 204a-b that are at least partially compatible with the UE 202, the controller module 210 may generate and store the PLMN selection procedure 228 within the memory module 212. The PLMN selection procedure 228, when implemented by the UE 202, disables at least one software resource and/or at least one hardware resource of the UE 202 that is configured to enable a scan of PLMN-specific supported access technologies, and supported frequency bands of PLMN-specific supported access technologies, that are evaluated as incompatible with a preferred operation of mobile terminal.

For example, the UE 202 may generate and populate the PLMN selection procedure 228 with an instruction set to disable or power-down each of the software module 216a and the hardware module 218a of the communication interface 214a. The respective modules 216a. 218a would otherwise be allocated to implement a PLMN selection scan of LTE access technology within the particular geographic region 206. Disabling or removing power supply from the modules 216a, 218a is beneficial because, in the present example, neither PLMN 204a nor PLMN 204b support the LTE access technology. This may translate into a power savings, and an increase in efficiency and battery life of a portable battery (not shown) of the UE 202. Further, preventing the scan of a non-existent PLMN access technology directly translates into a faster selection of a particular PLMN (e.g., PLMN 204a) within a particular region (e.g., geographic region 206). This is because time is not spent on scanning non-existent PLMN RATs.

Similarly, the UE 202 may generate and populate the PLMN selection procedure 228 with an instruction set to enable or power-on one or both of the software module 216b and the hardware module 218b of the communication interface 214b. One or both of these respective modules 216b, 218b may be required to implement a PLMN selection scan within the WCDMA access technology within the particular geographic region 206. This is beneficial because, in the present example, PLMN 204b supports WCDMA-850. Further, the UE 202 may generate and populate the PLMN selection procedure 228 with an instruction set to disable or power-down each of the software module 216c and the hardware module 218c of the communication interface 214c. The respective modules 216c, 218c would otherwise be allocated to implement a PLMN selection scan of GSM access technology within the particular geographic region 206. In this example, GSM communications within band 900/1800 is supported by both the UE 202 and PLMN 204a. Since the UE 202 also supports GSM-850/GSM-1900, the controller module 210 may thus preferably disable GSM-850/GSM-1900 support in the communication interface 214c to prevent potential interference with signals propagated to and from the communication interface 214b (and BST 220b), which implements WCDMA communications in band 850.

Referring now additionally to FIG. 3, an example embodiment of the local resource list 226 of FIG. 2 is shown. The example local resource list 226 is shown to include a PLMN section 302 and a UE section 304. The PLMN section 302 generally specifies a plurality of PLMN-specific access technology configuration parameters. For example, the PLMN section 302 is partitioned into a list entry column 306 that identifies a particular row within the PLMN section 302, an PLMN ID column 308, a supported RAT column 310, a supported frequency bands column 312, and an "other features" column 314. In the example shown, respective fields of the PLMN section 302 are populated with parameters specific to the PLMNs 204a-b, as described above in connection with FIG. 2. Additionally, the column 314 may contain any other feature(s) information associated with a particular PLMN such as, for example, whether a particular PLMN supports SMS-CB (Short Message Service-Cell Broadcast). In FIG. 3, the PLMN A is shown to support SMS-CB. In this example, the UE 202 (e.g., controller module 210) may be configured to adaptively enable/disable hardware and/or software modules associated with a SMS-CB of the UE 202 while "camping-on" a particular cell of PLMN A. Such an implementation may further increase mobile terminal battery lifetime and efficiency, as well as improving end-user quality of experience or service, such as described above in connection with FIG. 1.

The UE section 304 generally specifies a plurality of UE-specific access technology configuration parameters, and PLMN-selection-related parameters. For example, the example UE section 304 is partitioned into a configuration row 316 and an exception row 318. The example configuration row 316 is partitioned into a priority/supported RAT cell 320 and a supported frequency band cell 322. In the example shown, respective fields of the configuration row 316 are populated with parameters specific to the UE202, as described above in connection with FIG. 2. The example exception row 318 is partitioned into a default scan cell 324, a scan flag cell 326, a chipset designator cell 328, and a resource disable cell 330. Details associated with the example exception row 318 of the local resource list 226 are discussed in further detail below in connection with FIGS. 4-5.

Figure 4:
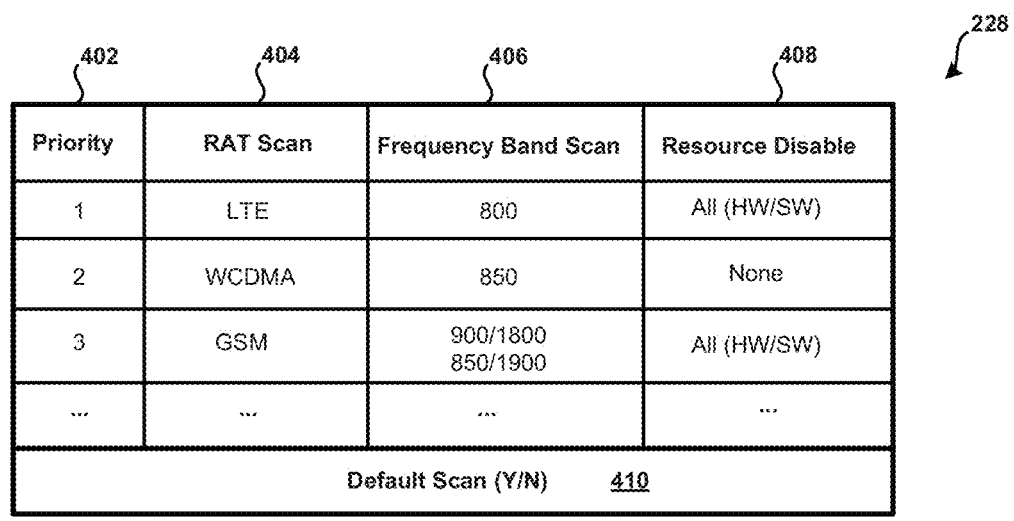
FIG. 4 shows an example embodiment of a PLMN selection procedure.
Figure 5:
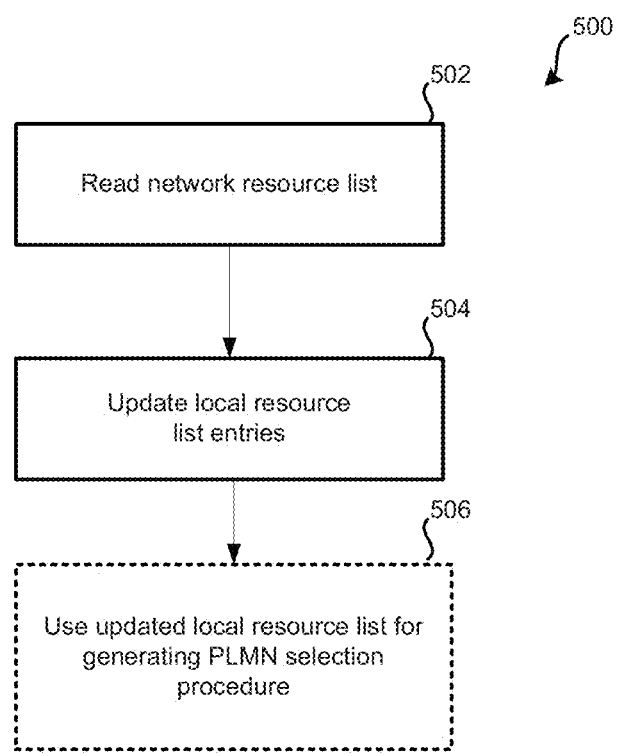
FIG. 5 shows a flowchart for an example method for maintaining the local resource list of FIG. 3.
Figure 6:
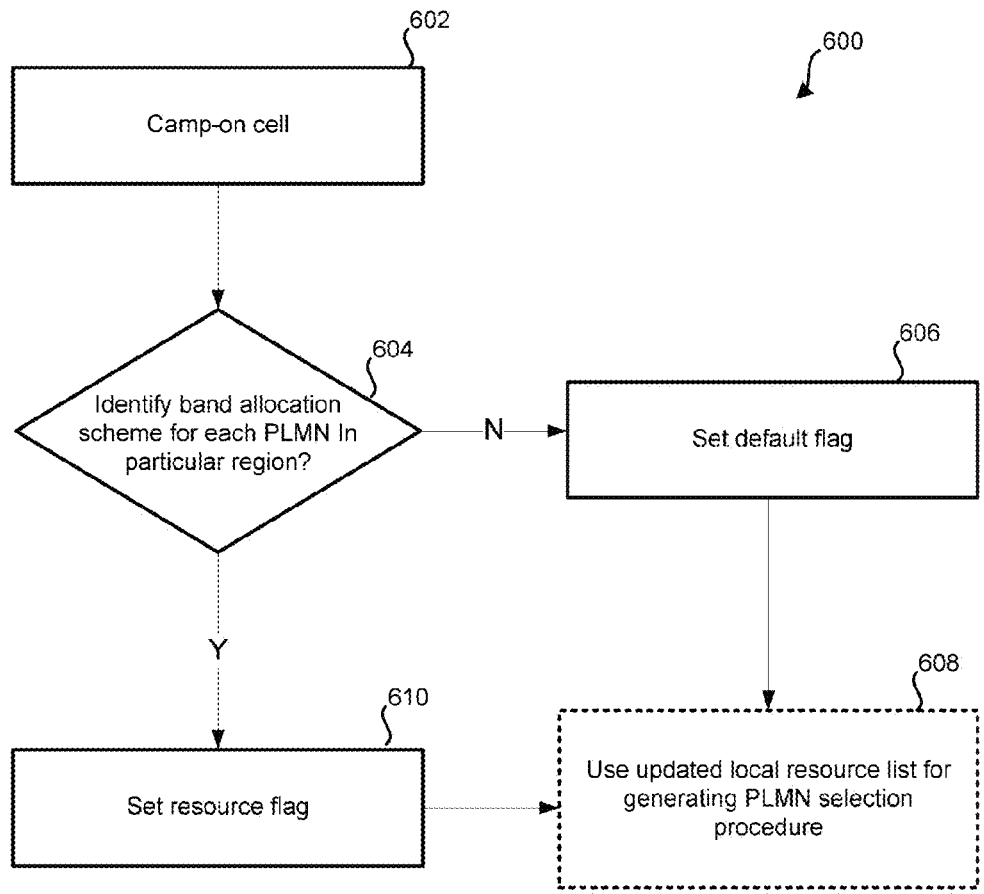
FIG. 6 shows a flowchart of an example method for updating exception data within the local resource list of FIG. 3.

Referring now additionally FIG. 4, an example embodiment of the PLMN selection procedure 228 of FIG. 2 is shown. The PLMN selection procedure 228 is shown to include a priority column 402, a RAT designator column 404, a frequency band scan column 406, a resource disable column 408, and a default scan row 410. In the example shown, the priority column 402, RAT designator column 404, and frequency band scan column 406 are populated with parameters specific to the UE202, derived from the configuration row 316 of the UE section 304 of the local resource list 226 as shown in FIG. 2. The default scan row 410 includes a binary (Y/N) indicator. As described in further detail below in connection with FIG. 5, the default scan row 410 indicates a binary "Y" to instruct the UE202 (controller module 210) to implement a PLMN selection scan in all supported RATs of the UE202, and all supported frequency bands of a corresponding RAT of the UE202, within the particular geographic region 206 when at least one of the PLMNs listed within the PLMN section 302 of the local resource list 226 does not specify any supported frequency bands within the supported frequency band column 312. Such a situation is "default" when a band allocation scheme of a particular PLMN is unknown.

As described above in connection with FIG. 2-4, PLMN selection procedure 228 is dependent on information contained within the local resource list 226. In general, the local resource list 226 may be maintained by the UE202 and/or periodically or at least intermittently updated by a compare and update algorithm using a network resource list 230 (see FIG. 2). For example, and referring now to FIG. 5, a method 500 for maintaining the local resource list 226 of FIG. 2 is shown.

The example method 500 includes reading (module 502), by the controller module 210, information contained within the network resource list 230. In general, the network resource list 230 is formatted in a manner substantially similar to the local resource list 226. For example, the network resource list 230 may at least include a PLMN section formatted to include similar information specified within the PLMN section 302, described above in connection with FIG. 3. For example, the network resource list 230 may at least include a list entry column that identifies a particular row within the PLMN section, a PLMN ID column, a supported RAT column, a supported frequency band column, etc., that together specifies a plurality of PLMN-specific access technology configuration parameters associated with PLMN networks (e.g., PLMN 204a-b) each respectively configured to provide network services or coverage within the particular geographic region 206 shown in FIG. 2. In this example, however, the network resource list 230 may include more "up-to-date" information than the local resource list 226 as stored within the memory module 212 of the UE202. The "up-to-date" information may be populated to the network resource list 230 in any number of ways. For example, one or both of the PLMNs 204a-b may periodically or at least intermittently update the network resource list 230, and then broadcast the network resource list 230 to the UE202 such that the UE202 may update the local resource list 226. In another example, an individual or entity, such as an end-user, an administrator, manufacturer, and others, may manually update the network resource list 230 using the computing device 224 (see FIG. 2) and then publish an updated version of the network resource list 230 to a network (e.g., Internet 222). Subsequently, one or both of the PLMNs 204a-b may periodically or at least intermittently broadcast the network resource list 230 to the UE202 such that the UE202 may update the local resource list 226. Alternatively, a user of the UE202 may download the updated version of the network resource list 230 via the Internet 222 to update the local resource list 226. Still other embodiments are possible.

The example method 500 further includes updating (module 504), by the controller module 210, the local resource list 226 by comparing all PLMN-specific entries of the local resource list 226 against the network resource list 230, and modifying the local resource list 226 to reflect any changes. For example, the network resource list 230 may indicate that the band allocation scheme for PLMN 204a has changed. In this example, the local resource list 226 may be updated by the controller module 210 to reflect the modified band allocation scheme. In instances where there are no changes in information associated with a particular PLMN (e.g., PLMN 204a), corresponding information within the local resource list 226 may remain unmodified. In instances where the network resource list 230 includes information about a particular PLMN, and the local resource list 226 does not include some or any information about the particular PLMN, the local resource list 226 may be updated by the controller module 210 to reflect the new information. Still other scenarios are possible.

For example, in instances where the local resource list 226 includes particular information about a particular PLMN, and the network resource list 230 does not include any information about the particular PLMN, the controller module 210 may identify a source of the particular information to determine whether or not to update the local resource list 226. For example, when the particular information is determined to be from an "old" version of the network resource list 230, the local resource list 226 may be updated by the controller module 210 to reflect information from the old version of the network resource list 230. When the particular information is determined to be from a PLMN selection scan result, the local resource list 226 may be maintained without change by the controller module 210. Other embodiments are possible. For example, in instances where particular information is identified as part of or during a PLMN selection scan that is absent from or not included within the network resource list 230, the local resource list 226 may be updated by the controller module 210 to reflect such information. Still other embodiments are possible. In this manner, the UE202 may provide information to the PLMNs 204a-b that the PLMNs 204a-b may not already have. Following appropriate updating of the local resource list 226 (see module 504), an updated version of the local resource list 226 may be used (module 506) for generating a PLMN selection procedure such as described in example embodiments of the present disclosure.

As mentioned above, the local resource list 226 includes an exception row 318 within the UE section 304 of the local resource list 226 (see FIG. 3). In example embodiments, the controller module 210 is configured to query respective fields within the exception row 318 as part of the process of generating the PLMN selection procedure 228. For example, and referring now to FIG. 6, an example method 600 for updating exception data within the local resource list 226 of FIG. 2 is shown.

The example method 600 includes a "camp-on" operation 602. At operation 602, a particular cell of a particular PLMN (e.g., PLMN 204a) within the particular geographic region 206 is "camped-on." In general, a cell is "camped-on" once the particular cell of the particular PLMN is selected to provide available services to the UE202. As part of those services, the particular PLMN may broadcast various information to the UE202 including, for example, various PLMN-specific access technology configuration parameters, such as those described above in connection with FIG. 3. For example, the UE202 may receive a broadcast from PLMN 204a that specifies PLMN ID, supported RAT, and a supported frequency bands of a supported RAT for PLMN 204a. Such information may be stored (and/or compared and stored, see FIG. 4) within corresponding fields of the local resource list 226 as shown in FIG. 3.

The method 600 further includes an identifying operation 604. At operation 604, the local resource list 226 may be searched to identify band allocation scheme information for each of the PLMNs 204a-b that operate within the particular geographic region 206. When at least one particular band allocation scheme cannot be identified at operation 604, the method 600 branches to a set default operation 606. At operation 606, the default scan cell 324 of the exception row 318 of the local resource list 226 is queried to read a particular rule contained therein (i.e., "If no designated PLMN-specific band allocation scheme . . . ") and, upon verification of the particular rule, a flag within the scan flag cell 326 of the exception row 318 is set to "True" for example. The method 600 then proceeds to a "use" operation 608 where an updated version of the local resource list 226 may be subsequently used for generating a PLMN selection procedure such as described in example embodiments of the present disclosure. More specifically, the controller module 210 may generate the PLMN selection procedure 228 such that the default scan row 410 indicates a binary "Y" to instruct the UE202 (controller module 210) to implement a PLMN selection scan in all supported RATs of the UE202, and all supported frequency bands of a corresponding RAT of the UE202. In this manner, when band allocation scheme information for each of the PLMNs 204a-b that operate within the particular geographic region 206 cannot be determined, a "default" PLMN selection scan may include scanning all UE202 supported RATs, and all corresponding supported frequency bands. Other embodiments are possible.

Referring back to operation 604, when a particular band allocation scheme for each of the PLMNs 204a-b can be identified at operation 604, the method 600 branches to a set resource operation 610. At operation 610, the chipset designator cell 328 of the exception row 318 of the local resource list 226 is queried to determine whether the UE202 is configured as single-chip or multi-chip device. More specifically, at determining whether the plurality of communication interfaces 214a-c of the transceiver module 208 are located on a single integrated circuit, or are located on multiple, distinct integrated circuits. Upon determining that the UE202 chipset type at operation 610, a resource disable parameter within the resource disable cell 330 of the exception row 318 is set to "HW" or "SW" or "All." The method 600 then proceeds to the "use" operation 608 where an updated version of the local resource list 226 may be subsequently used for generating a PLMN selection procedure.

More specifically, the controller module 210 may generate the PLMN selection procedure 228 such that the resource disable column 408 indicates "HW" or "SW" or "All" when it is determined that one or more resources of a particular communication interface of the UE202 (e.g., communication interfaces 214a) is to be disabled during a PLMN selection scan. In some embodiments, "HW" may be specified within the resource disable column 408 when it is determined at operation 610 that the UE202 is a multi-chip device, and "SW" may be specified within the resource disable column 408 when it is determined at operation 610 that the UE202 is a single-chip device. Additionally, in other embodiments. "All" may be specified within the resource disable column 408 when it is determined at operation 610 that the UE202 is either one of multi-chip device or single chip. Such an implementation may serve to more to fully disable or power-off all features of a particular communication interface of the UE202, thus potentially conserving additional power and effectively further preventing prevent wasteful power consumption. Still other embodiments are possible.

Figure 7:
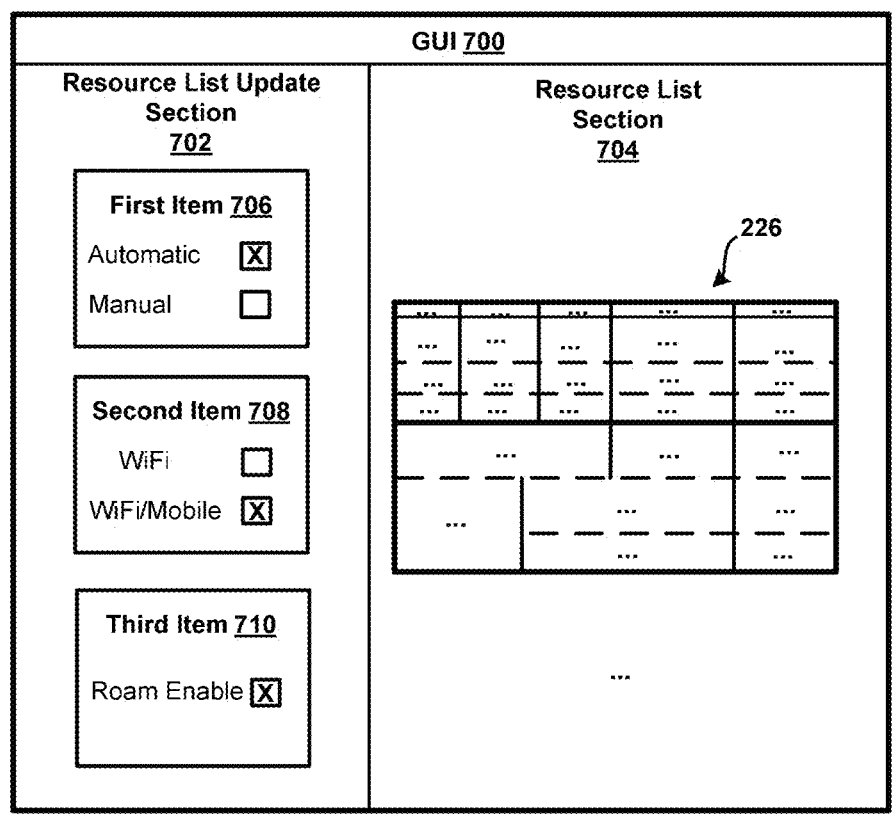
FIG. 7 shows an example graphical user interface configured for controlling resource list update functionality, and for interacting with the local resource list of FIG. 3.

Referring now to FIG. 7, an example embodiment of a GUI (Graphical User Interface) 700 configured for controlling resource list update functionality, and interacting with the local resource list 226 of FIG. 3 is shown. In particular, the example GUI 700 is shown to include a resource list update section 702, and resource list section 704. More or fewer sections of the GUI 700 are possible.

In this example, the resource list update section 702 is shown to include a first update item 706, a second update item 708, and a third update item 710. In general, the first update item 706 may enable a user to selectively enforce either an automatic or manual resource list update function or functionality. For example, when the first update item 706 is selected as "automatic," such as shown in FIG. 7, the local resource list 226 may be updated without manual user input in a manner such as described above in connection with FIGS. 5-6. Alternately, when the first update item 706 is selected as "manual," the local resource list 226 may be updated with manual user input. For example, upon selection of the first update item 706 to "manual," the local resource list 226 may be presented to the user within the resource list section 704 such that the user may modify one or more of a plurality of parameters listed within either one of the PLMN section 302 and the UE section 304 of the local resource list 226. Other embodiments are possible.

The second update item 708 may enable a user to selectively enforce either an update of the local resource list 226 by a computer network connection only, or by both a computer network connection and a mobile network connection. For example, when the second update item 708 is selected as "WiFi" the local resource list 226 may be updated only via a communication connection between the UE202 and a particular WiFi access point or hotspot. Alternately, when the second update item 708 is selected as "WiFi and Mobile Network," as shown in FIG. 7, the local resource list 226 may be updated via a communication connection between the UE202 and a particular WiFi access point or, for example, may be updated via a communication connection between the UE202 and a particular 3G network connection. The third update item 710 may enable a user to selectively enforce an update of the local resource list 226 when roaming. For example, when "roam enable" is selected (as shown in FIG. 7) and the second update item 708 is selected as "WiFi and Mobile Network," the local resource list 226 may be updated via a communication connection between the UE202 and a particular 3G network connection that is not within a HPLMN (Home Public Land Mobile Network) associated with the UE202. Other embodiments are possible.

Figure 8:
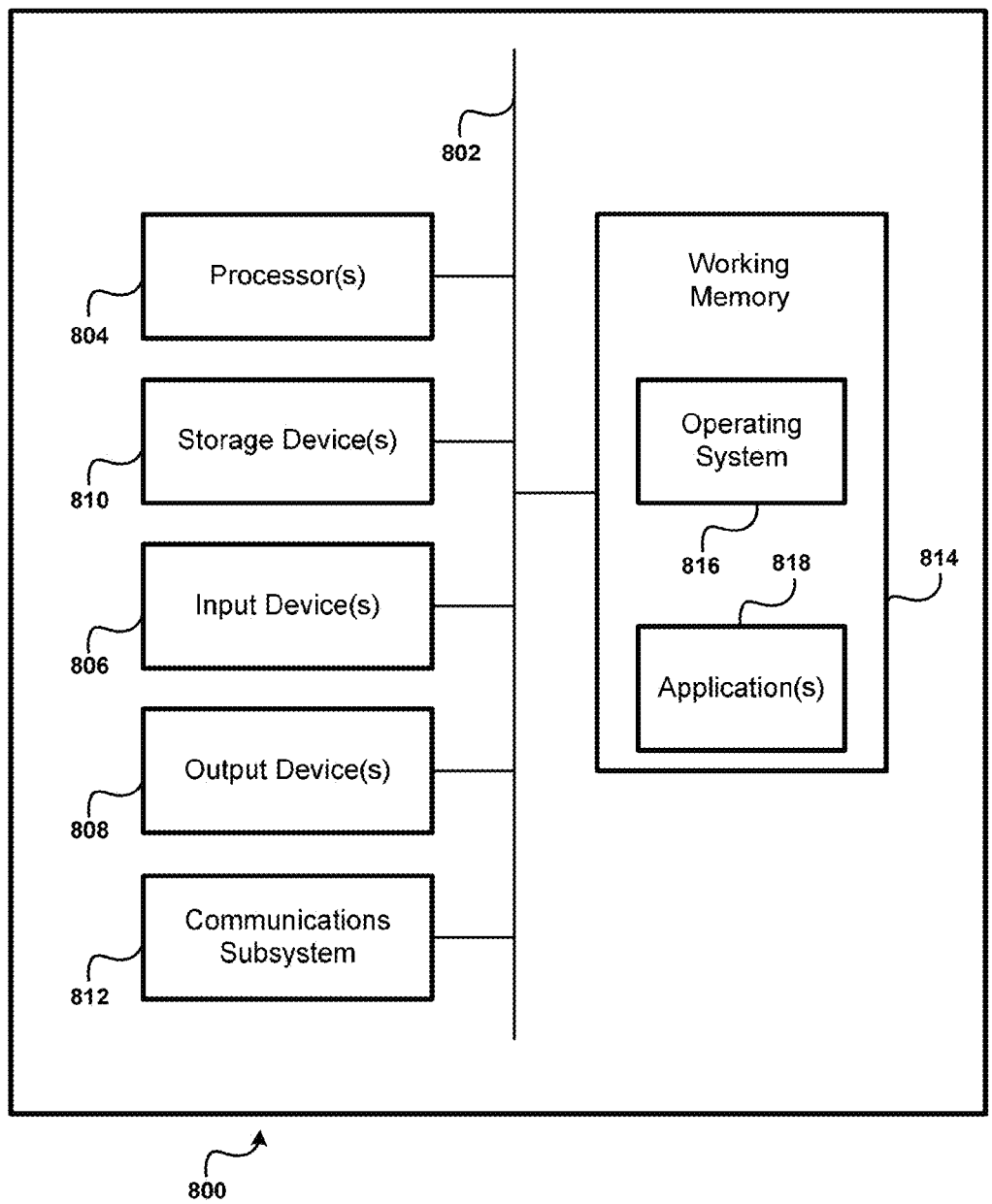
FIG. 8 shows an example mobile computing system or device.

FIG. 8 illustrates an embodiment of an example mobile computer system or device 800. An example of such a computer system or device includes a smart phone, feature phone, laptop computer, personal data assistant, and others. The computer system 800 may be wholly or at least partially incorporated as part of previously-described computing devices, such as the UE202, various components of PLMNs 204a-b, and computer device 224 of FIG. 2. The example computer device 800 may be configured to perform and/or include instructions that, when executed, cause the computer system 800 to perform the method of FIGS. 1, 5, and 6. Additionally, the computer device 800 may be configured to perform and/or include instructions that, when executed, cause the computer system 800 to implement, generate, and the like, a graphical user interface, such as the graphical user interface of FIG. 7. It should be noted that FIG. 8 is intended only to provide a generalized illustration of various components, any or all of which may be utilized as appropriate. FIG. 8, therefore, broadly illustrates how individual system elements may be implemented in a relatively separated or relatively more integrated manner.

The computer device 800 is shown comprising hardware elements that can be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which can include without limitation a remote control, a mouse, a keyboard, and/or the like: and one or more output devices 808, which can include without limitation a presentation device (e.g., television), a printer, and/or the like.

The computer system 800 may further include (and/or be in communication with) one or more non-transitory storage devices 810, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer device 800 might also include a communications subsystem 812, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 812 may permit data to be exchanged with a network (such as the network described below, to name one example), other computer systems, and/or any other devices described herein. In many embodiments, the computer system 800 will further comprise a working memory 814, which can include a RAM or ROM device, as described above.

The computer device 800 also can comprise software elements, shown as being currently located within the working memory 814, including an operating system 816, device drivers, executable libraries, and/or other code, such as one or more application programs 818, which may comprise computer programs provided by various embodiments, and/ or may be designed to implement methods, and/or configure systems, provided by other embodiments, as described herein. Merely by way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 800) to perform methods in accordance with various embodiments of the invention. According to a set of embodiments, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 might cause the processor(s) 804 to perform one or more procedures of the methods described herein.

The terms "machine-readable medium" and "computer-readable medium," as used herein, refer to any medium that participates in providing data that causes a machine to operate in a specific fashion. In an embodiment implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 810. Volatile media include, without limitation, dynamic memory, such as the working memory 814.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 804 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 804 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating a public land mobile network (PLMN) selection procedure, comprising:
   receiving, by a mobile terminal, a mobile country code (MCC) that identifies a particular geography;
   querying, by the mobile terminal, a local resource list using the MCC as a query parameter to identify a plurality of PLMNs each operably configured to provide coverage within at least a portion of the particular geography, wherein the local resource list is stored in a local memory within the mobile terminal;
   determining, by the mobile terminal, an access technology configuration (ATC) of each of the plurality of PLMNs, the ATC of each of the plurality of PLMNs including a supported access technology and supported frequency bands of the supported access technology;
   accessing, by the mobile terminal, the local resource list to identify and resolve incomplete ATC information for at least one of the plurality of PLMNs;
   comparing, by the mobile terminal, the ATC of each one of the plurality of PLMNs against an ATC of the mobile terminal;
   identifying, by the mobile terminal, a first PLMN of the plurality of PLMNs that is compatible with the mobile terminal, the first PLMN having a first supported access technology and a first supported frequency band of the first supported access technology;
   identifying, by the mobile terminal, a second PLMN of the plurality of PLMNs that is compatible with the mobile terminal, the second PLMN having a second supported access technology and a second supported frequency band of the second supported access technology;
   generating, by the mobile terminal, the PLMN selection procedure;
   removing power from a hardware resource to prevent a scan of the second supported frequency band of the second supported access technology when the second PLMN is both available and compatible with the mobile terminal, wherein the power is removed from the hardware resource to prevent potential interference with communication between the mobile terminal and the first PLMN;
   wherein the first supported access technology is different than the second supported access technology; and
   wherein the first supported frequency band is the same as the second supported frequency band.

2. The method of claim 1, further comprising:
instantiating the PLMN selection procedure; and
implementing a selection scan of PLMN-specific supported access technologies, and supported frequency bands of corresponding PLMN-specific supported access technologies, that are compatible with a preferred operation of the mobile terminal.

3. The method of claim 2, further comprising:
terminating at least one computer-implemented algorithm associated with a software resource to disable the software resource.

4. The method of claim 2, further comprising:
identifying, based on the selection scan and from the plurality of PLMNs, a plurality of preferred PLMNs;
identifying a priority level of each one of the plurality of preferred PLMNs; and
selecting a most significant PLMN of the plurality of preferred PLMNs for establishing a communication connection with the mobile terminal.

5. The method of claim 2, further comprising:
identifying, based on the selection scan, a preferred PLMN selected from the plurality of PLMNs; and
establishing a communication connection between the preferred PLMN and the mobile terminal.

6. A computer-implemented method, comprising:
receiving, by a mobile multimode user equipment (MMUE), a mobile country code (MCC) that identifies a particular geography;
querying, by the MMUE, a local resource list using the MCC as a query parameter to identify a plurality of PLMNs each operably configured to provide coverage within at least a portion of the particular geography, wherein the local resource list is stored in a local memory within the MMUE;
determining, by the MMUE, an access technology configuration (ATC) of each of the plurality of PLMNs, the ATC of each of the plurality of PLMNs including a supported access technology and supported frequency bands of the supported access technology; accessing, by the MMUE, the local resource list to identify and resolve incomplete ATC information for at least one of the plurality of PLMNs;
comparing, by the MMUE and based on searching, the ATC of each one of the plurality of PLMNs against an ATC of the MMUE;
identifying, by the MMUE, a first PLMN of the plurality of PLMNs that is compatible with the MMUE, the first PLMN having a first supported access technology and a first supported frequency band of the first supported access technology;
identifying, by the MMUE, a second PLMN of the plurality of PLMNs that is compatible with the MMUE, the second PLMN having a second supported access technology and a second supported frequency band of the second supported access technology;
generating, by the MMUE, a PLMN selection procedure;
removing power from a hardware resource to prevent a scan of the second supported frequency band of the second supported access technology when the second PLMN is both available and compatible with the MMUE, wherein the power is removed from the hardware resource to prevent potential interference with communication between the MMUE and the first PLMN;
wherein the first supported access technology is different than the second supported access technology; and
wherein the first supported frequency band is the same as the second supported frequency band.

7. The method of claim 6, further comprising:
disabling a software resource of the MMUE by terminating at least one computer-implemented algorithm associated with the software resource.

8. The method of claim 6, further comprising searching the local resource list in response to a power-on event of the MMUE.

9. The method of claim 6, further comprising searching the local resource list in response to a cell camp-on event of the MMUE where the MMUE obtains service of a particular PLMN within the particular geographic region.

10. The method of claim 6, further comprising:
receiving an updated resource list from the plurality of PLMNs;
modifying the local resource list to reflect changes thereto; and
storing the modified local resource list in the local memory of the MMUE.

11. The method of claim 6, further comprising:
receiving an updated resource list from an online resource different than the plurality of PLMNs;
modifying the local resource list to reflect changes thereto; and
storing the modified local resource list in the local memory of the MMUE.

* * * * *